Figure 1:
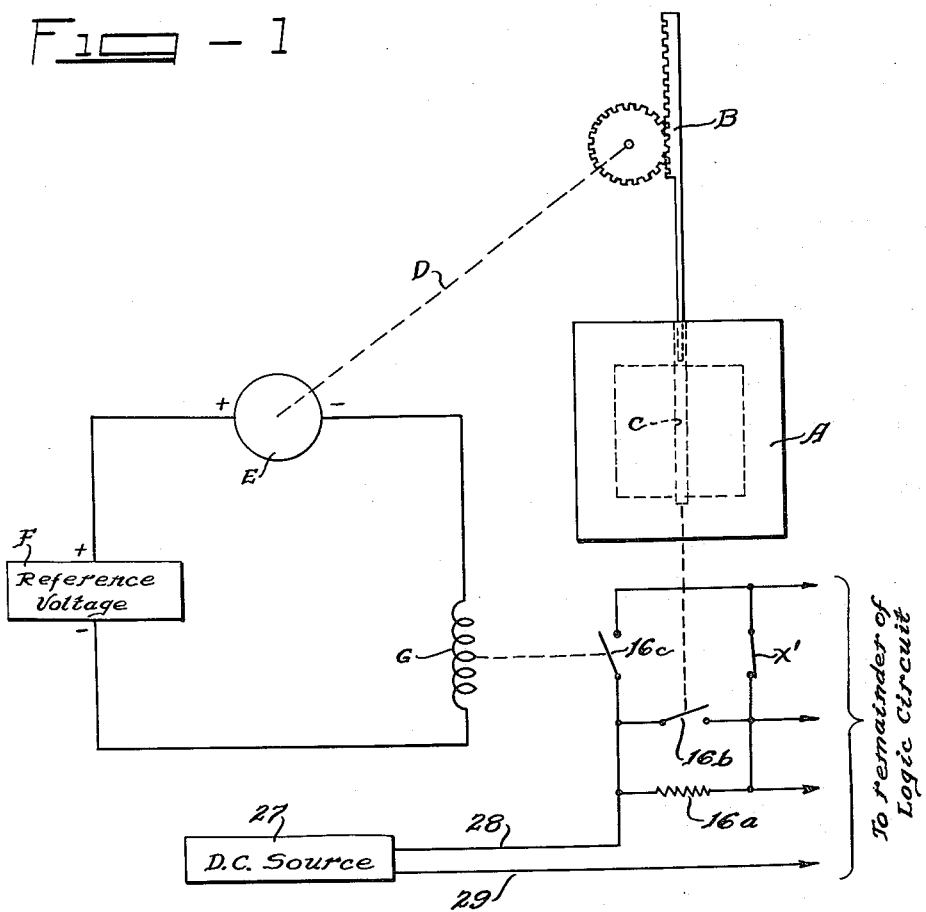

Dec. 24, 1963

G. H. STRONG ETAL 3,115,451

LOGIC CIRCUIT

Filed July 13, 1962

2 Sheets-Sheet 1

INVENTORS
Grant H. Strong
Melvin L. Faught

BY
Roland G. Anderson

Attorney

Dec. 24, 1963
G. H. STRONG ETAL
3,115,451
LOGIC CIRCUIT
Filed July 13, 1962
2 Sheets-Sheet 2
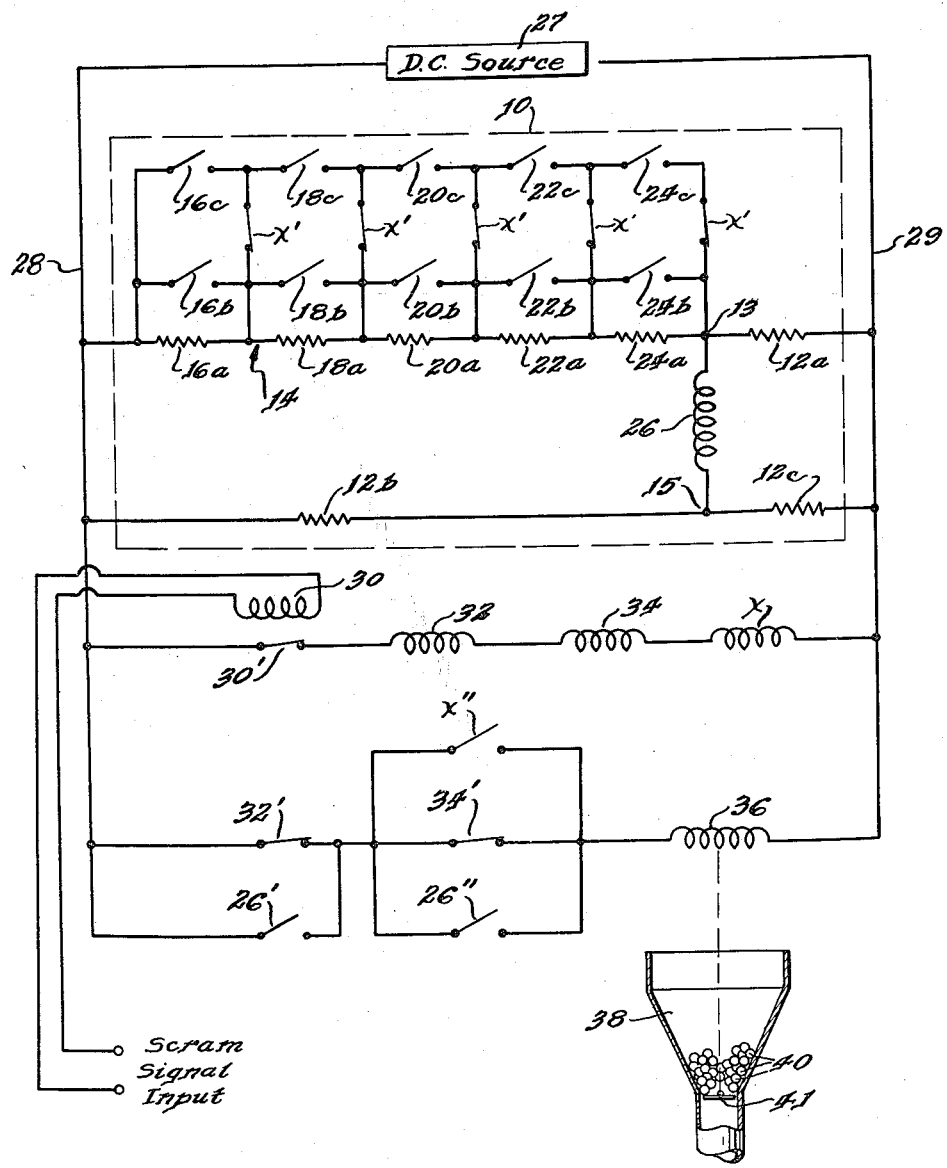
F̲i̲g̲-2̲
INVENTORS
Grant H. Strong
Melvin L. Faught
BY
Roland G. Anderson
Attorney

United States Patent Office 3,115,451
Patented Dec. 24, 1963

3,115,451
LOGIC CIRCUIT
Grant H. Strong, Richland, and Melvin L. Faught, Kennewick, Wash., assignors to the United States of America as represented by the United States Atomic Energy Commission
Filed July 13, 1962, Ser. No. 209,807
8 Claims. (Cl. 204—193.2)

This invention relates generally to a device for counting the occurrence of physical events and more specifically to an interconnecting logic device for the safety control systems of nuclear reactors.

Modern nuclear reactors operating in the thousand megawatt thermal energy range require fast and reliable controls. These controls must operate during emergencies to reduce the reactor neutron flux from about $10^{13}$ neutrons/sec.-cm.$^2$ to essentially zero in one or two seconds.

Because of the extreme importance of reactor control most high energy reactors utilize three separate control systems. Each system is capable of shutting down the reactor under normal conditions. The first or normal control system utilizes control rods of some neutron absorbing material that are moved into or out of the reactor core to start up, to adjust power levels, and to shut down the reactor under normal conditions.

The second control is a system of safety rods which are operated automatically by sensing devices which detect abnormal process conditions, including its own component failures, and generate a scram signal. This scram signal actuates the safety rods which may be gravity dropped into the reactor core or mechanically driven therein.

The third control is a backup safety system for the safety rods and may comprise small neutron absorbing balls, usually of boron, which are held in cylindrical hoppers on top of the reactor. The ball hoppers are arranged in zones corresponding to the pattern of the safety rods and are held in fail-safe reserve for extreme emergencies or failure of the safety rod system. During such emergencies or failure, the ball hoppers are operated, allowing the neutron poison to enter the reactor core.

Various logic means have been heretofore employed to interconnect the safety rods and the ball backup system. However, the complexity of such devices often detracts materially from their usefulness and reliability. Relay matrices are often employed for this purpose and inherent difficulties are encountered in trouble shooting for faulty relay contacts. In complex control systems this becomes almost an impossible task for the average maintenance craftsman. In fail-safe operation a failure of a component may result in spurious ball drops and consequent loss of reactor output.

It is, therefore, an object of this invention to provide a simplified interconnecting logic device between the safety rods and the backup system of a nuclear reactor.

It is another object of this invention to provide a means of actuating a backup system if a predetermined configuration of safety rods fail to reach their effective position in the core of a nuclear reactor.

It is still another object of this invention to provide a logic device capable of weighing the control effect ($\Delta k$) of each safety rod of a safety rod system and actuating a backup system in response thereto.

It is still another object of this invention to provide a logic device responsive to both the velocity with which safety rods enter the reactor core and the attainment of their final position in a given time for controlling a backup system in accordance with the control effect thus indicated.

It is still another object of this invention to provide a device for weighing the occurrence of physical events according to their comparative importance and for responding after a predetermined condition has been reached by the occurrence of said physical events.

Other objects will become apparent as the detailed description proceeds.

In general, this invention utilizes a Wheatstone bridge circuit which is adapted to prevent the de-energizing of the hopper coils of a ball backup system (thus preventing the neutron poison from entering the reactor) if safety rods, sufficient in total control effect, properly enter the reactor core to effect emergency shut down. A novel feature of this logic device is the connecting of a plurality of resistances in an arm of the Wheatstone bridge, each of said resistances being associated with a particular safety rod and weighted in value according to the control effect ($\Delta k$) of said particular safety rod, and in connecting a plurality of switching means to said resistances for switching each of them into or out of the bridge circuit, each of said switching means in one group thereof being responsive to the presence of a particular safety rod in its effective position in the reactor core, and each of said switching means in another group thereof being responsive to the attainment of a predetermined velocity by a particular safety rod enroute to said effective position. The bridge is unbalanced in one direction during normal reactor operation prior to the generation of a scram signal, and the plurality of switching means and resistances are adapted to unbalance the bridge in the opposite direction if the safety rods produce a predetermined amount of control effect in response to a scram signal. This current reversal is then utilized to prevent the actuation of the backup system, or, conversely, a failure of the safety rods to bring the reactor under control produces no such current reversal and allows the backup system to become actuated.

Along with the information to follow, a more complete understanding of the invention will be obtained from consideration of the accompanying drawings, in which:

FIG. 1 is a diagrammatic representation of the manner in which the logic system is connected with the nuclear reactor; and FIG. 2 is a schematic diagram of the remainder of the logic system showing the operating state during normal reactor operation of an embodiment of the invention suitable for a bank of five safety rods.

Referring to FIG. 1, it may be seen that a nuclear reactor A is shown with a safety rod B fully withdrawn from its channel C as it is in normal reactor operation. (For simplicity of illustration, only one safety rod B is shown.) The axial movement of rod B into channel C is transferred into a relative rotational motion by a suitable transmission means D so as to drive a D.C. tachometer generator E. Generator E is connected in a series loop with a reference voltage source F and a polarized relay coil G. Coil G actuates normally open relay contacts 16c in the logic circuitry to be hereafter described. The polarity of generator E opposes that of voltage F, and the polarity of coil G is such that it will be responsive only to current flow in the direction opposite to the current produced by voltage F. Thus, contacts 16c close only when the generator E overrides voltage F an amount sufficient to energize coil G. Contacts 16b shown in the logic circuitry are representative of a position sensitive switching means associated with rod B and its channel C and will also be fully described later in the specification.

It should be noted in the figures that the primed reference characters refer to the contacts and the same unprimed characters refer to the associated coil of an electromechanical relay. For example, the five X′ contacts and the X″ contact in FIG. 2 are actuated by coil X. The condition, open or closed, of the contacts as shown in the figures indicate the condition of the contacts during the normal operation of the reactor prior to scram, and are expressed as "normally open" or "normally closed" in accordance therewith.

Referring to FIG. 2, a diagram of the logic circuitry is shown, the heart thereof being a Wheatstone bridge circuit 10 having a resistance arm 12a connected to a control arm 14 at junction 13, and a resistance arm 12b connected to a resistance arm 12c at junction 15. Control arm 14 comprises series resistances 16a, 18a, 20a, 22a, and 24a and normally open "position" contacts 16b, 18b, 20b, 22b, and 24b each connected across the resistance of like numerical reference character. Also, control arm 14 contains normally open "velocity" contacts 16c, 18c, 20c, 22c, and 24c each connected in series with a further set of contacts X'. These series circuits composed of said sets of "velocity" contacts and contacts X' are also connected in parallel with their associated resistances 16a, 18a, 20a, 22a, and 24a.

A polarized relay coil 26 is connected across junctions 13, 15. A direct current power source 27 is connected to the extremities of arms 12b and 14 by power lead 28 and connected to the extremities of arms 12a and 12c by power lead 29.

Connected in series across power leads 28, 29 are normally closed relay contacts 30' and time delay relay coils 32, 34 and X. Contacts 30' are caused to open when relay coil 30 is energized by receipt of a scram signal. Also connected in series across power leads 28, 29 are: a parallel circuit consisting of normally closed contacts 32' and normally open contacts 26'; another parallel circuit consisting of normally open contacts X", normally closed contacts 34' and normally open contacts 26"; and a ball hopper coil 36. Coil 36 is schematically indicated as controlling the release mechanism 41 of the ball hopper 38 so as to release the neutron absorbing balls 40 when de-energized.

Relay coils 32, 34, and X have the delay upon de-energization. The delay of 34 is the shortest, with the delay of X being longer than 34 and the delay of 32 being longer than either X or 34. Relay X—X'—X" has its X' and X" contacts overlapped so that the normally open X" contact will close before the five normally closed contacts X' open.

Reference is now made to the operation of the device. The characteristics of Wheatstone bridges are well known in the electrical art. At balance, no current will flow through polarized relay coil 26, such balance occurring when the resistance of control arm 14 equals the product of the resistance of arm 12a and arm 12b divided by the resistance of arm 12c. Resistance of control arm 14 of a higher value than this will produce a current flow in one direction through polarized relay coil 26, and, conversely, resistance of a lower value will produce a current flow in the opposite direction. The change in current flow from one direction to another is effected by the closing of certain combinations of contacts 16b, 18b, 20b, 22b, and 24b or contacts 16c, 18c, 20c, 22c, and 24c which short out resistances 16a, 18a, 20a, 22a, and 24a, respectively. Thus, the resistance of control arm 14 is initially higher than the balance value with the closing of the contacts therein causing it to become lower in value than at balance so as to effect a reversal of current through polarized relay coil 26, the polarity being such that the relay will be responsive only to said reversed current.

Viewing the system shown in the figures in its entirety as an interconnecting logic device for the safety rods and the backup system of a nuclear reactor, contacts 16b, 18b, 20b, 22b, and 24b are each responsive to the presence of a particular safety rod in its effective position in the reactor core. The closing of one of said contacts signifies that a particular safety rod has properly entered the reactor core so that its full control function will be realized. As an illustration, rod B is shown in FIG. 1 with its associated position responsive contacts 16b. The contacts may represent any of a number of switching means. For example, a limit switch could be used that closes after a given safety rod has traveled a predetermined optimum distance into the reactor core, said distance being dependent on the size and design of the reactor. In general, however, the switch would be positioned so that the contacts would close after the rod had fully or substantially seated itself in its channel. As another example, a proximity switch could be used that closes and opens as the safety rod piston passes by, the proximity switch picking up a latch relay upon closing which in turn closes the associated contact in the bridge circuit.

A second group of contacts 16c, 18c, 20c, 22c, and 24c operate in a manner similar to that described above. However, these contacts are responsive to the velocity of the rods enroute to their position within the reactor core. Referring to FIG. 1, the axial velocity of rod B is converted into a signal proportional to said velocity by the tachometer generator E which opposes a reference voltage F. The polarized relay coil G, connected across generator E and voltage F, is actuated by generator E when a voltage is generated that is sufficient to reverse the current flow in the loop. Coil G is polarized to respond only to current flow in a direction opposite to that produced by the reference voltage F, said voltage being adjusted in value so that coil G will energize and close contacts 16c when the velocity of rod B reaches a predetermined "sufficient" value. Like arrangements, not shown, exist for the other safety rods (not shown) corresponding to contacts 18c, 20c, 22c, and 24c.

As an illustration of the operation of the device shown in FIGURE 2, assume the following values of the components:

$12a = 12b = 12c = 3500$ ohms
$16a = 4000$ ohms
$18a = 3000$ ohms
$20a = 2000$ ohms
$22a = 2000$ ohms
$24a = 1000$ ohms With the values given, the balance point would occur when the resistance in control arm 14 equals 3500 ohms. This, of course, is impossible, the values of the resistances in the control arm being purposely chosen so that the bridge will always be unbalanced in one direction or another. It may be noted that the values of the resistances in control arm 14 are varied. This has been done to illustrate the weighting of the control effect ($\Delta k$) of each safety rod. The value of each resistance is selected so as to be proportional to the statistical weight of the position of its associated rod in the reactor core geometry. Thus, since rod B is centrally located in the reactor, it has the greatest control effect, and its associated resistance 16a has the greatest ohmic value. The balance resistance value is set by control design considerations, and illustrates in this example, that the current will reverse through polarized relay coil 26 whenever the following combinations of resistances are shorted out of the control arm circuit due to the closing of the appropriate contacts:

16a, 18a, and 20a;
16a, 18a, and 22a;
16a, 18a, 20a, and 22a;
16a, 18a, 20a, and 24a;
16a, 18a, 22a, and 24a;
16a, 20a, 22a, and 24a;
16a, 18a, 20a, 22a, and 24a Any of the above combinations leaves less than 3500 ohms in the control arm, thereby reversing the current flow through coil 26, while any other combination will leave in over 3500 ohms and the direction of current flow through coil 26 will be unchanged.

Referring to FIG. 2, in normal reactor operation all the safety rods are fully withdrawn and stationary, and the contacts in control arm 14 are therefore all open except for the five X' contacts which are held closed by time delay relay coil X. Relay coil X and time delay relay coils 32 and 34 are maintained in an energized state by the normally closed scram signal actuated contact 30', all of said relay coils having the delay upon de-energization.

When a scram signal is generated by the reactor monitoring devices, the safety rods drop into their respective channels (by conventional control means not shown) and contacts 30' open, thus opening the power circuit to time delay relay coils 32, 34 and X. The time delay before drop-out of coil 32 is longer than that of coils 34 and X, so that we can consider contacts 32' as remaining closed while the action of coils 34 and X is discussed.

While coils 34 and X are timing out, the velocity sensitive contacts 16c, 18c, 20c, 22c, and 24c in control arm 14 will be closing as the safety rods reach a predetermined entering velocity. If, before coil 34 times out and normally closed contacts 34' open, one of the aforementioned combinations of resistances in control arm 14 are shorted out of the control arm by the velocity sensitive contacts, then polarized relay 26 will pick up and normally open contacts 26" will close. (Contacts 26' will also close, but this may be disregarded for the present.) Thus, the ball hopper coil 36 will remain energized by the power circuit even when contacts 34' open after the delay of relay coil 34. However, if sufficient resistance remains in control arm 14 after coil 34 times out, relay coil 26 will not pick up, its contacts 26" will not close, and the hopper coil 36 will be de-energized by the opening of contacts 34', which will allow the poison to enter the reactor.

The delay of relay coil X is slightly longer than the delay of coil 34 and its contacts are overlapped so that normally open X" contact will close before the five normally closed X' contacts open. It may therefore be seen that contacts X" will close and short out contacts 34' and 26" before contacts X' open and separate the velocity contacts from the control arm. Thus, if sufficient rod velocity is obtained to effect a current reversal in the bridge, hopper coil 36 will remain energized when contacts 26" (and also contacts 26') open again after the control arm resistances are all returned to the circuit by the opening of the five contacts X'. Should insufficient rod velocity be obtained, the time gap between the timing out of coil 34 and the subsequent timing out of coil X allows hopper coil 36 to be momentarily de-energized before contacts X" close, thus allowing the balls to drop.

If rod velocity is sufficient to maintain hopper coil 36 in an energized state during the period between drop-out of coil 34 and drop-out of coil X, then the position sensitive contacts 16b, 18b, 20b, 22b, and 24b must be considered. At this point, the five contacts X' are open and contacts X" are closed due to the drop-out of coil X, contacts 26' and 26" are open, and relay coil 32 has not as yet timed out. Therefore, if sufficient rods become properly seated before coil 32 times out and its contacts 32' open, one of the aforementioned combinations of resistances in control arm 14 will be shorted out by the corresponding combination of contacts 16b, 18b, 20b, 22b, and 24b, thus effecting another reversal of the bridge current and the energization of polarized relay coil 26. This closes contacts 26' and holds hopper coil 36 in the power circuit. The failure of contacts 26' to close before contacts 32' open will, of course, at least momentarily de-energize hopper coil 36 and allow the balls to enter the reactor.

Thus, we have provided a fail-safe system wherein the backup control balls will be permitted to drop into the reactor unless both of the following two conditions are met:

(1) Sufficient rods (taking into account their respective control weights) have greater than a predetermined "sufficient" velocity during all of a predetermined short period which begins shortly after receipt of a scram signal.

(2) Sufficient rods (taking into account their respective control weights) have reached their fully effective positions within a predetermined time after receipt of a scram signal.

The initial velocity responsive feature (condition 1) provides an anticipation for condition 2 in that if the requisite initial velocity condition is not attained, in all probability the requisite final position condition will not be attained.

Since the closing of switches 26' and 26" in response to current reversal through coil 26 may be visually observed, it is apparent that either or both of these switches serves as an indicating means for the condition of the bridge circuit. Obviously separate indicating means of various types responsive to current reversal in coil 26 could be used, if desired.

It may be noted that, if desired, the velocity sensing feature may be eliminated from the circuit leaving only the position sensitive contacts, time delay relay 32—32', polarized relay 26—26', scram signal actuated relay 30—30', hopper coil 36, and bridge arms, ball hopper, and power source. This leaves a simple but effective position sensitive logic system which is adequate in many instances, though somewhat less responsive than the combined velocity and position sensing system described.

Persons skilled in the art will, of course, readily adapt the general teachings of the invention to embodiments other than the specific embodiment illustrated. Furthermore, it is inherent in the principle of operation of the device shown in the figures that the invention may be applied to a bank of safety rods of any number merely by changing the number of resistances and contacts in the control arm to coincide with the number of rods. Accordingly, the scope of the protection afforded the invention is not intended to be limited to the particular embodiment shown in the drawings and described above, but should be determined only in accordance with the appended claims.

What is claimed is:

1. A device to indicate when a predetermined condition has been reached by the occurrence of physical events comprising a D.-C. bridge circuit; a D.-C. power source connected to the input of the bridge circuit; unidirectional current sensing means connected to the output of the bridge circuit for sensing the flow of current in one direction; a plurality of impedances connected in at least one arm of the bridge circuit, each of said impedances being associated with a particular physical event, said impedances having ohmic values corresponding to the comparative importance of the associated particular event; a plurality of switching means connected to said impedances for switching each of said impedances into or out of said bridge circuit; means responsive to the occurrence of the associated particular physical event for actuating each of said switching means; the bridge circuit being initially unbalanced in a direction such that current will flow through the unidirectional current sensing means in a direction opposite to said sensing direction, said plurality of switching means and impedances being adapted to unbalance the bridge circuit in a direction such that current will flow through the unidirectional current sensing means in said sensing direction after a predetermined condition is reached by the occurrence of said physical events; and indicating means responsive to said sensing direction current flow through the unidirectional current sensing means.

2. The device according to claim 1, wherein said plurality of impedances are connected in one arm only of the bridge circuit and comprise series connected resistances, and each of said switching means are connected across each of said series connected resistances.

3. In combination with a safety system for shutting down a nuclear reactor which comprises neutron absorbing safety rods responsive to a scram signal and a neutron absorbing ball backup system for supplementing the action of the safety rods, an interconnecting logic device for actuating the backup system if the safety rods fail to effect emergency shut down comprising: a D.-C. bridge circuit; a D.-C. power source connected to the input of the bridge circuit; unidirectional current sensing means connected to the output of the bridge circuit for sensing the flow of current in one direction; a plurality of impedances connected in at least one arm of the bridge circuit, each of said impedances being associated with a particular safety rod, said impedances having ohmic values corresponding to the control effect of the associated rod upon the reactor; a plurality of switching means connected to said impedances for switching each of said impedances into or out of said bridge circuit; means responsive to the associated safety rod reaching a predetermined optimum position in the reactor core for actuating each of said switching means; the bridge circuit being initially unbalanced in a direction such that current will flow through the unidirectional current sensing means in a direction opposite to said sensing direction, said plurality of switching means and impedances being adapted to unbalance the bridge circuit in a direction such that current will flow through the unidirectional sensing means in said sensing direction after a predetermined control effect is obtained by the travel of the safety rods into the reactor core; timing means responsive to said scram signal for actuating the backup system after a predetermined time lapse following said scram signal; and means responsive to said sensing direction current flow through the unidirectional current sensing means for deactivating said scram signal activated timing means.

4. The device according to claim 3, wherein said plurality of impedances are connected in one arm only of the bridge circuit and comprise series connected resistances, and each of said switching means are connected across each of said series connected resistances.

5. The device according to claim 4, wherein the unidirectional current sensing means is the coil of a polarized electromechanical relay, the means for deactivating said scram signal activated timing means is the contacts of said polarized relay, and said timing means is a time delay electromechanical relay.

6. In combination with a safety system for shutting down a nuclear reactor which comprises neutron absorbing safety rods responsive to a scram signal and a neutron absorbing ball backup system for supplementing the action of the safety rods, an interconnecting logic device for actuating the backup system if the safety rods fail to effect emergency shutdown comprising: a D.-C. bridge circuit; a D.-C. power source connected to the input of the bridge circuit; unidirectional current sensing means connected to the output of the bridge circuit for sensing the flow of current in one direction; a plurality of impedances connected in at least one arm of the bridge circuit, each of said impedances being associated with a particular safety rod, said impedances having ohmic values corresponding to the control effect of the associated rod upon the reactor; a first plurality of switching means connected to said impedances for switching each of said impedances into or out of said bridge circuit; means for measuring the velocity of said rods; means responsive to the attainment of a predetermined optimum velocity by each associated safety rod for actuating each of said switching means; a second plurality of switching means connected to said impedances for switching each of said impedances into or out of said bridge circuit; means responsive to each associated safety rod reaching a predetermined optimum position in the reactor core for actuating each of said second switching means; the bridge circuit being initially unbalanced in a direction such that current will flow through the unidirectional current sensing means in a direction opposite to said sensing direction, said impedances and first plurality of switching means being adapted to unbalance the bridge circuit in a direction such that current will flow through the unidirectional sensing means in said sensing direction after a predetermined control effect is obtained by the travel of the safety rods into the reactor core; said impedances and second plurality of switching means also being adapted to unbalance the bridge circuit in a direction such that current will flow through the unidirectional sensing means in said sensing direction after a predetermined control effect is obtained by the travel of the safety rods into the reactor core; first and second timing means responsive to said scram signal for actuating the backup system after a first and second predetermined time lapse following said scram signal; a first means responsive to said optimum rod velocity initiated sensing direction current flow through the unidirectional current sensing means for deactivating said scram signal activated first timing means; and a second means responsive to said optimum rod position initiated sensing direction current flow through the unidirectional current sensing means for deactivating said scram signal activated second timing means.

7. Apparatus as claimed in claim 6 further including a third timing means responsive to said scram signal for deactivating said first timing means after a third predetermined time lapse following said scram signal, said third time lapse being greater than said first time lapse and less than said second time lapse.

8. In combination with a safety system for shutting down a nuclear reactor which comprises neutron absorbing safety rods responsive to a scram signal and a neutron absorbing ball backup system for supplementing the action of the safety rods, an interconnecting logic device for actuating the backup system if the safety rods fail to effect emergency shutdown comprising: a D.-C. bridge circuit; a D.-C. power source connected to the input of the bridge circuit; unidirectional current sensing means connected to the output of the bridge circuit for sensing the flow of current in one direction; a plurality of impedances connected in at least one arm of the bridge circuit, each of said impedances being associated with a particular safety rod, said impedances having ohmic values corresponding to the control effect of the associated rod upon the reactor; a plurality of normally open switches, each of said switches being connected across each of said impedances; means responsive to the associated safety rod reaching a predetermined optimum position in the reactor core for closing each of said switches; the bridge circuit with said switches open being initially unbalanced in a direction such that current will flow through the unidirectional current sensing means in a direction opposite to said sensing direction; the bridge circuit being unbalanced in a direction such that current will flow though the unidirectional current sensing means in said sensing direction when a predetermined ohmic value of said impedances are shorted out; timing means responsive to said scram signal for actuating the backup system after a predetermined time lapse following said scram signal; and means responsive to said sensing direction current flow through the unidirectional current sensing means for deactivating said scram signal activated timing means.

No references cited.